United States Patent
Gudmundsson

(10) Patent No.: US 8,701,510 B2
(45) Date of Patent: Apr. 22, 2014

(54) SMART MILK SAMPLER FOR VMS

(75) Inventor: Mats Gudmundsson, Sodertalje (SE)

(73) Assignee: DeLaval Holding AB, Tumba (SE)

( * ) Notice: Subject to any disclaimer, the term of this patent is extended or adjusted under 35 U.S.C. 154(b) by 676 days.

(21) Appl. No.: 12/979,401

(22) Filed: Dec. 28, 2010

(65) Prior Publication Data

US 2012/0160174 A1    Jun. 28, 2012

(51) Int. Cl.
*G01L 13/04* (2006.01)

(52) U.S. Cl.
USPC ...................................... 73/864.81

(58) Field of Classification Search
USPC ............... 73/1.02, 1.73, 447, 864.81, 863.33, 73/863.31; 119/14.02
See application file for complete search history.

(56) References Cited

U.S. PATENT DOCUMENTS

| | | | |
|---|---|---|---|
| 7,162,971 B2 * | 1/2007 | Johannesson et al. ..... | 119/14.18 |
| 2002/0124803 A1 * | 9/2002 | Chen et al. ................ | 119/14.08 |
| 2003/0143748 A1 * | 7/2003 | Gudmundsson et al. ....... | 436/43 |
| 2005/0223996 A1 * | 10/2005 | Bosma et al. .............. | 119/14.02 |
| 2009/0007847 A1 * | 1/2009 | Relin ......................... | 119/14.02 |
| 2011/0239943 A1 * | 10/2011 | Hanskamp ................. | 119/14.02 |

FOREIGN PATENT DOCUMENTS

| | | |
|---|---|---|
| EP | 1 381 269 B1 | 10/2004 |
| EP | 1 267 609 B1 | 1/2005 |

* cited by examiner

*Primary Examiner* — Peter Macchiarolo
*Assistant Examiner* — Mohammed Keramet-Amircola
(74) *Attorney, Agent, or Firm* — Young & Thompson

(57) ABSTRACT

A milk sampling apparatus and method receives milk from a milking machine and discharges discrete samples of the milk for analysis. In the method, milk is collected in a chamber, excess milk is emptied from the chamber by an emptying parts which reduces the milk in the chamber to a predetermined level, and milk samples of predetermined quantity are successively discharged through respective outlets located at different heights within the chamber and which are opened in turn from the uppermost outlet to the lowermost outlet.

20 Claims, 3 Drawing Sheets

SMART MILK SAMPLER FOR VMS

BACKGROUND OF THE INVENTION

This invention is concerned with milk sampling. The invention is more especially, although not exclusively, concerned with sampling milk in connection with the milking of animals, such as by an automated milking apparatus capable of milking animals without human supervision.

DESCRIPTION OF THE RELATED ART

There are known, for example, installations in which animals are free to visit a milking machine when they choose, and the milking machine is adapted to identify an animal visiting the machine and to decide if that animal is due to be milked. The automatic milking machine includes a robot arm for attaching teat cups to the teats of the animal if it is to be milked and a vacuum system to perform the actual milking. The milk extracted from the udder of the animal is conducted to a receiving vessel and, unless it is deemed of unacceptable quality for collection in which case it may be diverted and either discarded or collected for other use, the milk is subsequently delivered from the receiving vessel to a bulk storage tank in which the milk from an entire herd of animals may be accumulated and stored, the tank then being emptied once a day or every few days. For checking milk quality and for collecting data which can be helpful for herd management and for monitoring animal condition and state of health, it is usual for milk samples to be taken at the time of milking individual animals and subsequently analysed. Traditionally the samples from the respective animals are collected in small containers, such as sample tubes or the like, and the sample tubes with their contents are taken to a remote laboratory where an analysis of the milk samples is carried out. Sampling in this manner is generally performed regularly but only periodically such as once a month. In recent times analysers capable of analysing milk at or near to where the animals are milked have been developed and analysing equipment of this kind can have the advantage of the analysis results reaching the farm manager much quicker so that appropriate actions may be taken sooner to aid efficient milk production and the best possible animal welfare.

In EP 1381269B there is described milk sampling and analysis of the latter kind. The milk analysing apparatus is arranged to analyse separately respective portions of a milk sample in order to provide, on a real time basis, quantitative measurements on a combination of compounds and parameters present in the milk samples from individual herd members or a group of herd members so as to derive from the samples data relating to the health condition, the physiological condition, the nutritional and energy state, the state of the oestrus cycle and pregnancy. Thus, the analysis can aid optimal utilisation of feed rations by implementation of feeding schemes on an individual animal or group basis, tight control of subclinical and clinical disease conditions that affect milk production and composition, optimal reproduction control and reliable pregnancy detection. Not every analysis is performed on every milk sample and a means is included for directing the milk sample portions to the separate analysing means only as desired, such as at pre-selected points of time, or pre-selected time intervals in the reproduction and/or lactation cycles. For obtaining the milk samples for analysis EP 1381269131 proposes automatic on-line collection at the milking site from the milking system and automatic transfer to the analytical means. The milking site may be the milking site of an automatic milking system for freely moving animals, or one of several milking sites in a more conventional milking system such as a herringbone milking system, or a rotating carousel type of milking parlour, or a parallel milking parlour. More specifically, for collecting milk samples from individual animals there is suggested in EP 1381269B1 a collecting means for collecting a proportional milk sample which is representative of the average composition of the total milk produced during the milking of each animal, and comprising a container for storing the sample, which container may be pressurised above the pressure of the milking system for subsequent and/or parallel transport of subsamples to the analysing means. Additionally the sample collecting means can comprise means for apportioning a milk sample to the analysing means, whereby a total sample is divided into one or more subsamples which is/are transported to the analysing means while a remaining part of the sample may be led to the bulk milk tank or discharged. While the milk collecting means is generally described in these terms in EP 1381269, no specific sample collecting arrangement adapted for use with an automatic milking machine is disclosed.

In EP 1267609 B1 there is described a milk sampling arrangement for use with an automated milking system and adapted to deliver milk samples to storage tubes for subsequent transport to a remote laboratory for analysis. The sampling arrangement includes a milk collection vessel into which a representative amount of milk, e.g. about 2% of the total amount of milk from an animal milking, is delivered from a conduit or vessel of the automated milking system. The collection vessel has two different discharge outlets at different heights, the upper outlet being connection to a discharge line and the lower outlet being at the bottom of the vessel and connected to one end of a hose having a filling member at the other end. The filling member is positionable over a selected sample tube by an X-Y positioning system. After all the milk to be collected from an animal milking has flowed into the vessel, compressed air is supplied to the vessel to stir the milk. The major part of the milk in the vessel is then discharged through the upper discharge outlet and may be thrown away, returned to the automated milking system or transported to the milk tank. A certain quantity of milk then remains in the lower part of the vessel and this milk sample is delivered through the lower discharge outlet to pass to the filling member and to the selected collection tube. The arrangement is suitable for collection of single milk samples in respective collective tubes.

SUMMARY OF THE INVENTION

The object of the present invention is to provide a simple and convenient apparatus and method for collection and delivery of a plurality of milk samples, such as collection of milk from an automotive milking machine, and delivery of one or more samples directly to a milk analysing means, for example of the kind described in EP 1381269 B1.

In accordance with a first aspect the present invention provides a milk sampling apparatus for receiving milk from a milking machine and forwarding discrete samples of the milk to respective discharge paths for analysis, comprising a chamber for receiving an amount of milk greater than the aggregate amount of the discrete samples, emptying means operable to empty milk from the chamber for reducing the milk quantity in the chamber to a predetermined level, two or more sample outlets from the chamber, the outlets being at different heights whereby samples of milk of predetermined quantity can be discharged from the chamber by selectively opening the outlets in turn from the uppermost to the lowermost outlet.

The apparatus of the invention enables the preparation and delivery of discrete milk samples of predetermined quantity in a simple and convenient way since sophisticated control arrangements are not needed. Thus, the need for sensors can be avoided and the apparatus can be operated by simple control to open and close valves in an appropriate sequence as will become apparent from the detailed description which follows.

The excess milk can be emptied and/or the milk samples can be discharged from the chamber by gas, e.g. air, pressure which can be supplied to the chamber through the milk inlet.

Although other arrangements are possible, in a preferred construction the lowermost sample outlet is located at the bottom of the chamber so that the chamber is completely emptied upon delivery of the respective sample through this outlet. The sample outlets and/or the emptying means can each be defined by an opening in the side wall of the chamber or by an element extending into the chamber through the bottom, side or top wall of the chamber. In a preferred construction at least one sample outlet and/or the emptying means comprises a dip tube with an opening at a preset height in the chamber.

At least one sample discharge path can include a check valve. The check valve can allow fluid, such as a washing fluid, to be introduced into the discharge path without that fluid flowing into the chamber. Thus, a washing fluid supply may be provided for supplying a washing fluid into the sample discharge path downstream of the position at which the check valve closes the discharge path. A second check valve may similarly be provided to close communication between the sample discharge path and the washing liquid fluid supply when a milk sample is discharged from the chamber into the sample discharge path. In this way an unwanted flow of milk into the washing fluid supply means is conveniently avoided. In an especially simple construction the two check valves are formed by an integrated 3-way valve, whereby the two check valves can share a common valve member which can move between and engage against either of two valve seats.

A preferred apparatus embodying the invention has at least one of the sample outlets connected to a discharge path, for example formed by a tube, arranged for temporary storage of a milk sample discharged from the chamber for delivery to a milk analysing means, and a washing fluid supply is provided for supplying washing fluid to flow through the discharge path, after the stored milk sample is admitted to the analysing means. The washing fluid will remove any remnants of the milk sample from the discharge path before the next milk sample is delivered into the discharge path from the chamber. A drying air supply may also be provided for supplying air to flow through the discharge path after the washing liquid for drying the discharge path. In this way milk sample is prevented from contaminating a following milk sample, and the milk samples will be not diluted by the washing fluid. The analysing means may include a sample intake device to which the discharge path is connected. The sample intake device controls the delivery of milk samples to the analysing arrangement. The sample intake device can sense the presence of a milk sample waiting in the discharge path, and allow the sample to be advanced to the analysing arrangement when it is ready to perform an analysis on the next milk sample. The intake device will detect the washing fluid following the sample through the discharge path and will respond so that washing fluid and the subsequent drying air are diverted and do not pass to the analysing arrangement. The sample intake device will recognise the next fluid sample when it arrives from the sampling apparatus and will hold the sample in its temporary storage in the discharge path until the analysing arrangement is ready to accept it for analysis.

The chamber can have at an upper region a connection to atmosphere, and a device, such as a valve, preferably a pinch valve, for selectively opening and closing the connection. Opening the connection to atmosphere can facilitate flow of milk into the chamber. The connection can also serve as an overflow outlet to allow milk to escape from the chamber if the amount of milk supplied to the chamber exceeds a maximum volume.

The chamber may include a connection for selectively admitting air into a lower region of the chamber. The air admitted through this connection will bubble through and mix the milk contained in the chamber so that the samples subsequently removed are representative of the whole amount of milk collected in the chamber. This air connection may also conveniently serve as a drain for discharging unwanted milk from the chamber. Alternatively a separate drain could be provided.

It is preferred that the sample outlets are opened and closed by pinch valves. Other valves controlling fluid flow into or out of the chamber can also comprise pinch valves. Pinch valves are preferred for ease of cleaning and reasons of hygiene. A pinch valve includes a flexible tube which can be collapsed by an element operated by an actuator to close off the flow of fluid through the tube.

The apparatus of the invention can be conveniently incorporated in a housing with two compartments, the chamber and the milk flow lines to and from the chamber being accommodated in one compartment, and actuating devices for operating valves which control the flow through the milk flow lines being accommodated in the other compartment.

Having regard to the foregoing in accordance with a second aspect the invention also provides an apparatus for preparing and delivering a plurality of milk samples for analysis, comprising a chamber to receive from a milking apparatus an amount of milk obtained from a milked animal, a discharging arrangement for separating a first milk sample of predetermined quantity from the milk in the chamber and delivering the first milk sample into a first discharge path, and for separating a second milk sample of predetermined quantity from the milk in the chamber and delivering the second milk sample to a second milk discharge path, and a washing fluid supply arrangement for supplying washing fluid to and through at least one discharge path, the washing fluid supply arrangement being connected to supply the washing fluid downstream of a device that can be closed so that washing liquid supplied to the discharge path does not flow into the chamber.

Preferred features referred to above and defined in the dependent claims may also be incorporated with advantage in a sampling apparatus according to the second aspect.

The present invention additionally provides a method of delivering discrete samples of milk to respective discharge paths for analysis, comprising the steps of:

a) receiving milk from a milking machine and collecting the milk in a chamber;

b) emptying excess milk from the chamber;

c) discharging a first milk sample from the chamber through a first milk outlet connected to a first discharge path; and d) discharging a second milk sample from the chamber through a second milk outlet connected to a second discharge path.

In carrying out the method, the excess milk can first be emptied from the chamber to reduce the amount of milk in the chamber to a predetermined quantity. The first milk sample can then be discharged from the chamber through the first milk outlet which is at a first height, and the second milk sample can be subsequently discharged from the chamber through the second milk outlet which is at a height different to that of, in particular lower than, the first outlet. Each sample can have a respective predetermined quantity which can be determined by the outlet positions for the excess milk and the milk samples.

By discharging milk samples from the chamber through respective milk outlets opening in the chamber at different heights, samples of predetermined quantity are readily obtained and sensors for the milk height and/or for measuring the milk flow from the chamber are not necessary.

Washing fluid can be supplied into at least one of the discharge paths after the milk sample has been delivered through the discharge path, such as for delivery to an analysing arrangement.

In view of the above, the invention also provides a method of preparing and delivering a plurality of milk samples of predetermined quantity for analysis, comprising the steps of: supplying to a chamber an amount of milk obtained from milked animal; discharging from the chamber into a first discharge path a first milk sample of predetermined quantity; discharging from the chamber into a second discharge path a second milk sample of predetermined quantity; and when at least one of the first and second milk samples has been delivered through the discharge path, supplying a washing fluid to and through the discharge path while the connection between the chamber and the discharge path is closed.

Drying air can be supplied to the at least one discharge path after the flow of washing fluid therethrough so that the discharge path is cleaned and dried before the next milk sample is delivered into the discharge path.

The milk collected in the chamber is preferably agitated before the milk samples are discharged, and more particularly before any milk is emptied from the chamber.

BRIEF DESCRIPTION OF THE DRAWINGS

The foregoing and other features and advantages of the invention will become apparent and better understood from the following detailed description which is given by way of example only and with reference to the accompanying drawings in which.

DESCRIPTION OF THE PREFERRED EMBODIMENTS

Figure 1:
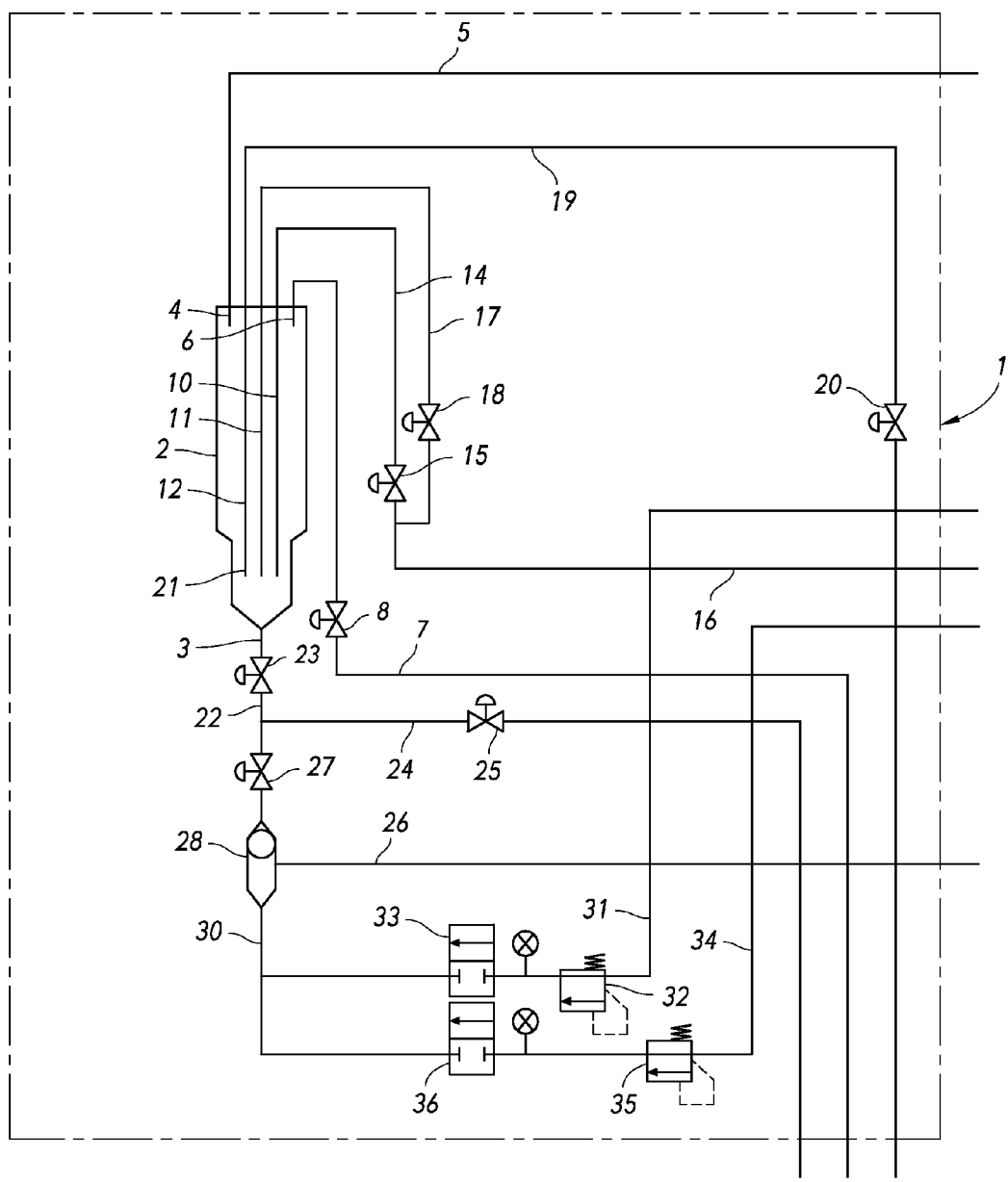
FIG. 1 is a schematic representation of a milk sampling apparatus in accordance with the present invention.

A milk sampling apparatus 1 embodying the invention is illustrated in FIG. 1 and as shown it comprises a container or chamber 2 including a cylindrical sidewall having a lower end part with a slightly smaller diameter than an upper end part. The chamber is closed at the top by an upper end wall which can be conveniently made as a releasable top cover normally fixed in secure sealed engagement with the upper end of the side wall. The lower end wall of the container is conical so that the interior of the chamber converges at the lower end to a first sample outlet opening 3. Provided at the top wall of the chamber are an inlet opening 4 which is connected to a flow line 5 which leads from the automatic milking machine as described below for supply of milk into the chamber 2, and an air outlet 6 which is connected to atmosphere through a flow line 7 which includes a pinch valve 8 operable to open and close the flow line 7. Extending through the top wall and down into the interior of the chamber are three dip tubes 10, 11, 12 each of which is open at its lower end located within the chamber. The upper end of a first dip tube 10 is connected to a first return milk line 14 which includes a pinch valve 15 and leads back to the automatic milking machine via a milk line 16, and the upper end of a second dip tube 11 is connected to a second return milk line 17 which includes a pinch valve 18 and also leads back to the automatic milking machine via the milk line 16. The third dip tube 12 is connected at its upper end to a milk line 19 defining a sample discharge path and including a pinch valve 20. The opening at the lower end of the third dip tube 12 constitutes a second milk sample outlet from the chamber 2.

The first milk sample outlet 3 opens into a discharge line which is forked downstream of a pinch valve 23, a first branch being a combined drain and air admission line 24 including a pinch valve 25, and the other branch being a milk sample line 26 forming a sample discharge path and including a pinch valve 27 and a three way check valve 28. Also connected to the milk sample line 26 through the check valve 28 is a washing fluid and drying air supply line 30, this supply line being connected to a washing liquid supply through a washing liquid supply line 31 including a pressure regulator 32 and a control valve 33, and to a drying air supply via a drying air supply line 34 which includes a pressure regulator 35 and a control valve 36.

Figure 2:
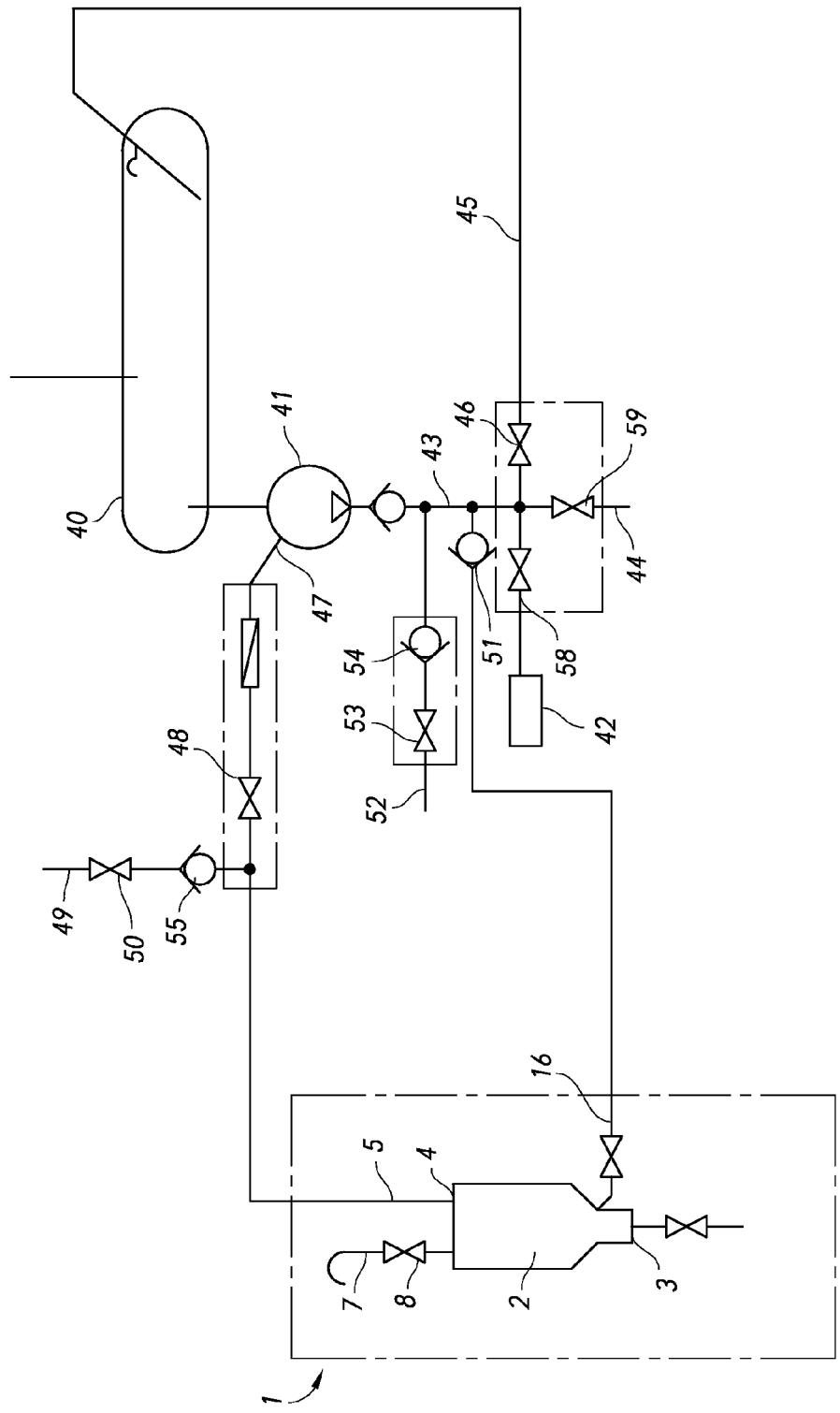
FIG. 2 is a schematic representation showing a milk supply system for delivery of milk to the milk sampling apparatus of FIG. 1 from an automatic milking machine.

As illustrated in FIG. 2, the milk sampling apparatus 1 of FIG. 1 is connected to collect and sample milk from the vacuum milking system of an automatic milking machine. The milking machine includes a receiver 40 for receiving milk extracted from the udder of an animal during milking. An outlet of the receiver 40 is connected to the inlet of a milk pump 41, the main outlet of which is arranged to be connected to a bulk storage tank 42 via a milk line 43 and valve 58. Branched from the milk line 43 are a drain line 44 equipped with a drain valve 59 and through which milk can be discharged if it is unsuitable for collection in the bulk storage tank, and a mixing line 45 which leads back to the receiver 40 and includes a valve 46 to open and close the mixing line 45. As shown, the pump 41 is equipped with a second outlet 47 through which an amount of milk proportional to the total amount of milk pass through the pump is discharged, the pump outlet 47 being connected to the inlet flow line 5 of the milk sampling apparatus through a sampling valve 48. Also connected to the flow line 5 downstream of the valve 48 is an air pressure supply line 49 fitted with a valve 50 and a check valve 55.

The milk return line 16 of the sampling apparatus is connected to the pump discharge line 43 via a check valve 51. Also connected to the pump discharge line 43 is an air pressure supply line 52 with control valve 53 and check valve 54 for supply of purging air at the end of milking.

During milking of an animal the receiver 40 is subjected to the milking vacuum and receives the milk extracted from the udder of the animal by the teat cups and the vacuum applied thereto. A minor sampling portion of the milk can be directed to the milk sampling apparatus 1, but different methods may be followed in this respect. In a first method the milk mixing line 45 is not used, and the milk is simply pumped from the receiver 40 to the milk tank 42 (unless it is to be discharged to drain) and a proportional amount of milk is discharged through the second pump outlet 47 and through the flow line 5 into the chamber 2 of the sampling apparatus. The sample valve 48 may be opened after a short delay to minimise carry over of milk from the previous milking of another animal. Alternatively, the milk may be collected in the receiver 40 and circulated by the pump 41 and the mixing line 45 by opening valve 46 while valves 58 and 59 remain closed. This circulation of milk ensures good mixing of the milk so that the entire volume of milk is of substantially uniform consistency whereas the consistency generally varies in the course of emptying an udder. When the mixing is completed the valve 46 is closed and the valve 58 is opened so that the milk will be transported by the pump 41 to the bulk milk tank 42. During this phase of emptying the receiver either a substantially fixed quantity of the milk can be transferred through the flow line 5 into the chamber 2 of the sampling apparatus, or a proportional amount of the milk extracted from the udder during milking can be transferred to the chamber 2 of the milk sampling apparatus.

During the supply of milk to the chamber 2 the outlet valves 15, 18 and 23 are closed but the pinch valve 8 is held open to allow air from inside the chamber to escape to atmosphere to avoid a pressure build up in the chamber as it fills with milk. If the amount of milk delivered into the chamber exceeds the maximum volume of the chamber the surplus milk may be allowed to overflow through the flow line 7 connected to atmosphere. When all of the milk to be collected for sampling has been delivered into the sampling chamber 2 the milk collected in the chamber can be agitated and mixed to ensure that the milk samples to be delivered will be representative of the composition of all of the milk collected in the chamber. For this purpose, with the inlet 4 of the chamber connected to the vacuum of the milking system through the flow line 5, and the valve 8 of the line 7 which is connected to atmosphere closed, pinch valves 23 and 25 are opened so that air is drawn in through the line 24 and bubbles upwardly through the milk in the chamber to mix the milk. After an adequate mixing time pinch valves 23 and 25 are closed again. By closing valve 48 and opening the air valve 53, air is under pressure is then delivered into the chamber 2 above the surface level of the milk, through the flow line 5 and inlet 4. The pinch valve 15 (or the pinch valve 18 if only one milk sample is required as explained below) is opened so that the excess milk above the level of the inlet opening of the dip tube 10 (or dip tube 11) is discharged through the dip tube and the first return milk line 14 (or second return milk line 17) and the milk line 16 so that this excess milk is returned to the milking machine at the milk line 43 and can pass to the bulk milk storage tank 42 (or if required be discharged to drain). The dip tube 10 along with the milk lines 14, 16 and the valve 15 constitute an emptying means for emptying excess milk from the chamber 2 to reduce the milk quantity in the chamber to a predetermined level, the predetermined level being at the height of the opening at the lower end of the dip tube 10 in the chamber. When the milk in the chamber has been reduced to the predetermined level the pinch valve 15 is closed again and the apparatus is ready for delivery of a first sample of predetermined quantity. For delivery of this sample the pinch valve 20 is opened and the milk in the chamber is delivered through the dip tube 12 and the flow line 19 of the first sample discharge path. The sample line 19 may be connected to an apparatus for delivery of samples into collection tubes for transportation to a remote laboratory for analysis. Alternatively the flow line 19 could be connected directly to analysing equipment. The sample is discharged and delivered through the discharge path under the positive air pressure still prevailing in the chamber because the connection to the air supply line 49 is still open. The predetermined quantity of this sample is the volume of the chamber 2 between the inlet opening of the first dip tube 10 and the inlet opening 21 of the third dip tube 12.

If at the time of milk sampling the first sample is not required, the excess milk can be emptied from the chamber through the second dip tube 11 and the second return line 17, the inlet opening of the second dip tube 11 being at the same height in the chamber 2 as the inlet opening 21 of the third dip tube 12.

After discharge and delivery of the milk sample through the discharge path of the sample line 19 (or emptying of the excess milk through the second milk return line if the first sample is not required) the sampling apparatus is ready for discharge of a second sample. After the pinch valve 20 has been closed, the pinch valves 23 and 27 can be opened for the milk remaining in the chamber 2 to be discharged through the outlet 3 and into the milk sample line 26 which defines the second sample discharge path. During discharge of the sample, due to the positive air pressure in the chamber 2, the valve member of the 3-way check valve 28 automatically seals against the seat to close the connection to the washing fluid and drying air supply line 30 so that the milk sample passes into the sample line 26. This sample can be delivered into a line, such as a tube of predetermined length and diameter in which the sample can be held temporarily to await delivery to a milk analysing apparatus, for example a tube 30 meter long and 3 mm internal diameter for an 80 ml sample.

Figure 3:
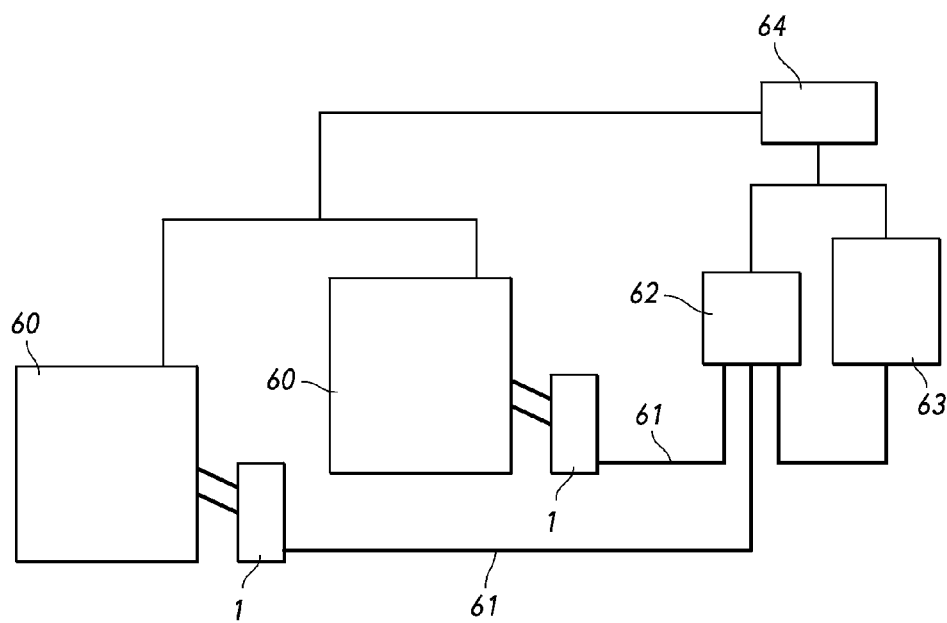
FIG. 3 is a schematic illustration of an automatic making arrangement with two automatic milking machines and associated milk sampling apparatus according to the invention for delivery of milk samples to a milk analyser via a sample intake device.

FIG. 3 shows two automatic milking machines 60 each equipped with a milk sampling apparatus 1. Each milk sampling apparatus has its sample flow line 26 connected by a tube 61, which provides a temporary storage for milk samples, to a sample intake device 62 which has an outlet connected to an analyser 63. The analyser and the sample intake device are controlled by a control unit 64 which is also connected to exchange data with the computers which control the automatic milking machines. Each sampling apparatus 1 is controlled via its respective associated milking machine.

After the milk sample has been delivered into the tube 61 through the sample discharge line 26 it is held until it is determined that it, or at least a portion of it, can be delivered to the analyser 63 for analysis and the sample intake device 62 responds accordingly. When the sample is advanced by sample intake device, washing fluid, such as water, can be supplied to the upstream end of the flow line 26 by opening the valve 33. The washing fluid enters the line 26, under pressure set by the regulator 32, and via the 3-way check valve 28 which automatically resets so that the valve member seals against the seat of the valve that prevents washing liquid passing through the valve towards the chamber 2. The check valve avoids risk of jeopardising operation of the pinch valve 27 since pinch valves in general are not able to resist high fluid pressures. The washing liquid flushes the line 26 and the tube 61 leading to the sample intake device 62 for removing any remnants of the milk sample so that the next sample delivered will not be contaminated by milk from the previous sample. Following the supply of washing fluid drying air can be passed through the line 26 and the tube 61 leading to the sample intake device, by closing the valve 33 and opening the valve 36, for eliminating washing fluid from inside the tube so that the next sample delivered into the tube will not be contaminated or diluted by the washing fluid.

It may be noted that as soon as a milk sample has been discharged from the chamber into the tube 61 to await delivery to the analyser, refilling of the chamber 2 for the next sampling can commence.

The control unit 64 and the computers controlling the milking machines 60 communicate and determine when samples should be taken and delivered by each sampling apparatus 1. It may be noted that if the second sample discharged through the outlet 3 is not required, this milk can be discharged to drain by opening the pinch valves 23 and 25 so that the sample is discharged through the line 24.

The quantity of the second milk sample discharged through the outlet 3 is the volume of the chamber 2 up to the level of the opening 21 at the lower end of the dip tube 12. It will be understood that further dip tubes could be added if it was desired to delivery separately and successively more than the two samples that can be delivered by the embodiment of the sampling apparatus specifically described above.

With the described apparatus the samples of respective pre-determined quantity are determined and separately delivered by the positioning of the sample outlets and without need for level sensors in the chamber, strict timing control of the valves, or measurement of the milk flow from the chambers. As a consequence the apparatus is economic to manufacture and requires only simply control functions. In addition cleaning can be straightforward since, by connecting the flow line 5 and inlet 4 to receive cleaning liquid from the milking machine and by appropriate actuation of the valves of the sampling apparatus effective cleaning of all of the flow lines through which milk may flow can be assured. Another advantage is that milk loss or wastage is minimal. For example, the chamber 2 may receive up to 0.5 liter of milk and deliver two samples each in the range of 50 to 80 ml for analysis, with the excess milk being returned to the milking machine. Furthermore, the apparatus can be conveniently configured to be accommodated in a housing divided into two compartments with the chamber, flow lines and valves in one compartment and the actuators and electrics accommodated in the other compartment.

While a milk sampling apparatus of currently preferred construction and its operation have been described it will be appreciated that modifications and variations are possible and will occur to those skilled in the art without departing from the scope of the invention. As an example rather than the two dip tubes 11 and 12 a single dip tube could be used and be selectively connectable, e.g. through respective pinch valves, to either the sample discharge line 19 or the return milk line 16. Another possibility is that connections could be provided for supplying washing fluid and drying air also to the sample flow line 19 after discharge of a milk sample therethrough.

The invention claimed is:

1. A milk sampling apparatus for receiving milk from a milking machine and forwarding discrete samples of the milk to respective discharge paths for analysis, comprising:
  a single chamber that receives and concurrently holds milk for at least two discrete samples, the chamber having a volume greater than an aggregate volume of the two discrete samples, the chamber having a bottom, a top, and sides extending between the bottom and the top, with a total height defined between the bottom and the top, the chamber further comprising a milk inlet opening that connects, downstream, to a flow line leading from an milking machine, wherein the milk inlet opening receives the milk from the milking machine via the flow line;
  emptying means connected to the chamber and operable to empty milk from the chamber for reducing a milk quantity in the chamber to a predetermined level; and
  at least two sample outlets connected, via respective first and second discharge paths, to a milk analysis sample point for respectively discharging the two discrete samples from the chamber respectively through the first and second sample discharge paths to the sample point,
  wherein an inlet of a first of the sample outlets opens at a first height within the chamber so as to discharge a first milk sample from the first height within the chamber via the first discharge path to the sample point,
  wherein an inlet of a second of the sample outlet opens at a second height within the chamber so as to discharge a second milk sample from the second height within the chamber via the second discharge path to the sample point, the second height being lower than the first height so that the first sample outlet is an uppermost sample outlet and the second sample outlet is a lowermost sample outlet of the chamber, and
  wherein the inlets of the first and second sample outlets being at different heights within the chamber allow samples of milk of predetermined quantity be discharged from the chamber and to the sample point by selectively opening the first and second sample outlets in turn from the uppermost sample outlet to the lowermost sample outlet.

2. The apparatus according to claim 1, wherein the inlet of the lowermost sample outlet is located at the bottom of the chamber, and the sample point comprises a milk sample analyzer device.

3. The apparatus according to claim 2, wherein at least one of i) the sample outlets, and ii) the emptying means comprises a dip tube with an inlet opening at a preset height in the chamber.

4. The apparatus according to claim 1, wherein at least one of the sample discharge paths includes a first check valve.

5. The apparatus according to claim 4, further comprising:
  a washing fluid supply connected to the one of the sample discharge path at a position downstream of the first check valve, the washing fluid supply for supplying washing fluid to the one sample discharge path downstream of the first check valve.

6. The apparatus according to claim 5, further comprising:
  a second check valve operable to close communication between the one sample discharge path and the washing fluid supply when a milk sample is discharged from the chamber into the one sample discharge path.

7. The apparatus according to claim 6, wherein the first and second check valves are integrated as a 3-way valve.

8. The apparatus according to claim 1, wherein,
  the sample discharge path of at least one of the sample outlets is connected for temporary storage of a milk sample discharged from the chamber for delivery to an analysing arrangement, and
  further comprising a washing fluid supply for supplying washing fluid to flow through the sample discharge path of the one sample outlet, after the stored milk sample is admitted to the analysing arrangement, the washing fluid for removing any remnants of the milk sample from the discharge path before a next milk sample is delivered into the discharge path from the chamber.

9. The apparatus according to claim 8, further comprising:
  a drying air supply provided for supplying drying air flow through the discharge path of the one sample outlet after the washing fluid has passed through the discharge path.

10. A milk sampling apparatus for receiving milk from a milking machine and forwarding discrete samples of the milk to respective discharge paths for analysis, comprising:
  a single chamber that receives and concurrently holds milk for at least two discrete samples, the chamber having a volume greater than an aggregate volume of the two discrete samples, the chamber having a bottom, a top, and a total height defined between the bottom and top, the chamber comprising a milk inlet opening (4) that connects to a milk flow line leading from an milking machine, wherein the milk inlet opening receives the milk from the milking machine via the milk flow line;

emptying means connected to the chamber and operable to empty milk from the chamber for reducing a milk quantity in the chamber to a predetermined level; and at least two sample outlets for respectively discharging the two discrete samples from the chamber respectively through first and second sample discharge paths, wherein an inlet of a first of the sample outlets opens at a first height within the chamber so as to discharge a first milk sample from the first height within the chamber via the first discharge path to a sample point, wherein an inlet of a second of the sample outlet opens at a second height within the chamber so as to discharge a second milk sample from the second height within the chamber via the second discharge path to the sample point, the second height being lower than the first height so that the first sample outlet is an uppermost sample outlet and the second sample outlet is a lowermost sample outlet of the chamber, wherein the inlets of the first and second sample outlets being at different heights within the chamber allow samples of milk of predetermined quantity be discharged from the chamber by selectively opening the first and second sample outlets in turn from the uppermost sample outlet to the lowermost sample outlet;

a first connection to atmosphere located within an upper region of the chamber;

a device for selectively opening and closing the first connection to atmosphere;

a second connection for selectively admitting air into a lower region the chamber for agitating milk contained in the chamber, wherein the second connection for admitting air is also configured as a drain outlet for discharging unwanted milk from the chamber; and pinch valves in the sample discharge paths of each sample outlet, wherein the sample outlets are opened and closed by the pinch valves.

11. The apparatus according to claim 1, further comprising:
milk flow lines leading to and from the chamber;
valves for controlling flow through the milk flow lines; and
a housing with two compartments,
the chamber and the milk flow lines being accommodated in a first of the two compartments, and
the actuating devices for operating valves that control the flow through the milk flow lines being accommodated in a second of the two compartments.

12. A method of delivering discrete samples of milk to respective discharge paths for analysis, comprising the sequential steps of:
a) within a single chamber having an inlet connected downstream an outlet of a milk receiver (40) and that receives milk extracted from an udder of a milking via by a milking machine, receiving and collecting the milk from the milk receiver through the milk inlet, the chamber concurrently holding the milk for a first milk sample and for a second milk sample;
b) emptying excess milk from the chamber to reduce a milk quantity in the chamber to a predetermined level;
c) discharging the first milk sample from the chamber through a first milk outlet connected to a first sample discharge path, the first milk outlet having an inlet located at a first height within the chamber so as to discharge the first milk sample from the first height within the chamber to a milk sample analyzer; and
d) discharging the second milk sample from the chamber through a second milk outlet connected to a second sample discharge path to the milk sample analyzer, the second milk outlet having an inlet located at a second height within the chamber so as to discharge the second milk sample from the second height within the chamber, wherein the second height is lower than the first height so that the first sample outlet is an uppermost sample outlet and the second sample outlet is a lowermost sample outlet.

13. The method according to claim 12, comprising the further steps of:
supplying washing fluid into at least one of the sample discharge paths after the milk sample has been delivered through the one sample discharge path for delivery to an analysing arrangement, a connection between the chamber and the at least one sample discharge path being closing during the supplying of the washing fluid into the at least one sample discharge path; and
supplying drying air into the at least one sample discharge path after the washing fluid has flowed therethrough.

14. The method according to claim 12, comprising the further step of agitating the milk collected in the chamber before said step of discharging the first milk sample.

15. A method according to claim 12, wherein, the predetermined level in said step of emptying excess milk from the chamber is dependent on a number of samples to be discharged from the chamber.

16. The method according to claim 12, comprising the further steps of:
holding open a connection between an upper region of the chamber and atmosphere during said step of receiving and the collecting the milk in the chamber; and
closing the connection between the upper region of the chamber and the atmosphere subsequent to said step of receiving and the collecting the milk in the chamber.

17. The method according to claim 12, wherein the milk is emptied and the milk samples are discharged from the chamber under air pressure delivered to the chamber through the milk inlet to the chamber.

18. The method according to claim 12, wherein,
a first connection to atmosphere is located within an upper region of the chamber with a device for selectively opening and closing the first connection to atmosphere,
a second connection is configured for selectively i) admitting air into a lower region the chamber for agitating the milk contained in the chamber, and ii) as a drain outlet for discharging unwanted milk from the chamber, and
pinch valves are located in the sample discharge paths of each sample outlet, and
the method further comprises the steps of
opening and closing the sample outlets by opening and closing the pinch valves,
using the device to selectively open and close the first connection to expose an interior of the chamber to the atmosphere, and
using the second connection to selectively admit air into the lower region the chamber for agitating the milk contained in the chamber, and to discharge unwanted milk from the chamber.

19. The apparatus according to claim 1, further comprising a milk pump having i) an inlet connected to an outlet of a milk receiver that receives the milk from the milking machine, and ii) a first main outlet that connects, via a valve, to a milk bulk storage tank, and a second outlet that connects to an inlet of the flow line that connects to the milk inlet opening of the chamber.

20. The method according to claim 12, wherein,
a milk pump is provided having i) an inlet connected to an outlet of a milk receiver that receives the milk from the milking machine, and ii) a first main outlet that connects, via a valve, to a milk bulk storage tank, and a second outlet that connects to an inlet of the flow line that connects to the milk inlet opening of the chamber, and
the method further comprises the step of operating the pump to pump the milk from the milk receiver to the chamber and to the milk bulk storage tank.

* * * * *